Figure 1:
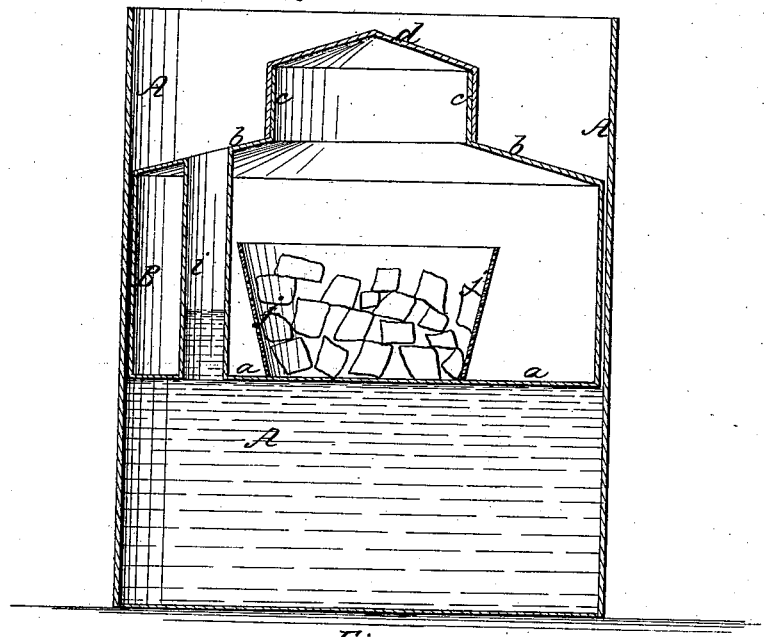
Figure 2:
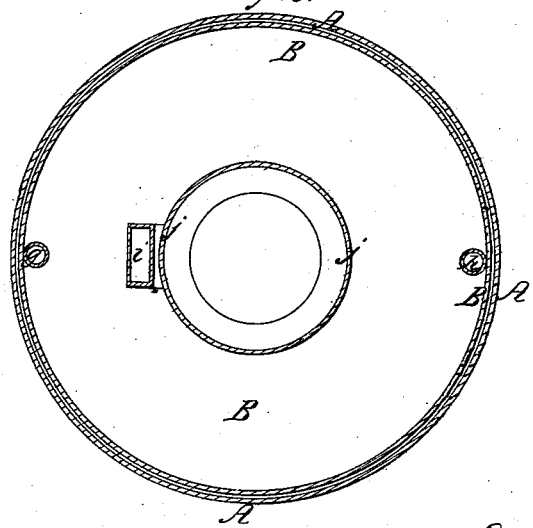

A. P. Bussey
Milk Cooler.

N° 96,390.     Patented Nov. 2, 1869.

Witnesses:

Inventor:

United States Patent Office.

A. P. BUSSEY, OF WESTERNVILLE, NEW YORK.

Letters Patent No. 96,390, dated November 2, 1869.

IMPROVEMENT IN MILK-COOLERS.

The Schedule referred to in these Letters Patent and making part of the same.

*To all whom it may concern:*

Be it known that I, A. P. BUSSEY, of Westernville, Oneida county, New York, have invented a new and improved Milk and Liquid-Cooler; and I do hereby declare that the following is a full, clear, and exact description thereof, which will enable others skilled in the art to make and use the same, reference being had to the accompanying drawings, forming part of this specification, in which—

The figure represents a vertical central section of my improved milk, liquid-cooler.

Similar letters of reference indicate corresponding parts.

This invention relates to a new apparatus for cooling milk and other liquids, and is more particularly adapted to the use of dairymen, for cooling the milk in the cans in which it is to be transported, and for keeping it cool while being conveyed.

The invention has for its object to cool the liquid on the upper surface by means of a cooling-vessel floating upon it.

The invention consists in the general arrangement of the cooling-vessel, which is so arranged that it can receive cooling-liquid or ice, or any other cooling-material, and that it will, at the same time, freely float on the liquid to be cooled.

A, in the drawing, represents a milk-can, of ordinary or suitable construction.

B is the cooling-vessel. The same is of cylindrical form, to fit the can A, so that it can move up and down in the can, and form a tolerably tight joint. It is made preferably of sheet-metal, with a flat bottom, *a*, and conical top plate *b*.

In the top plate is a central aperture surrounded by a vertical flange, *c*, which is adapted to receive a cover, *d*.

A pipe, *i*, extends vertically through the entire vessel B, to allow of the insertion of a thermometer, for ascertaining the temperature of the milk in the can.

Upon the bottom *e* is arranged a perforated flange, *j*, which forms a vessel for containing ice or other cooling-substance, which serves to retain the ice in the centre, but which may, if desired, be dispensed with.

The cover *d* is also of conical form. When closed upon the vessel B, the latter is so covered that the milk poured upon it will flow down to the sides and thence into the can.

The vessels B may be provided with suitable handles, to allow their ready removal from and reinsertion into the can.

Having thus described my invention,

What I claim as new, and desire to secure by Letters Patent, is—

The improved cooling-vessel B, formed by the combination of a body and cover, with pipe *i* and ice-holder J, all substantially as shown and described.

A. P. BUSSEY.

Witnesses:
FRANK BLOCKLEY,
ALEX. F. ROBERTS